April 8, 1958 R. WILSON 2,830,201
ELECTRO-ACOUSTIC TRANSDUCER WITH ACOUSTIC COUPLING MEANS
Filed Oct. 30, 1951
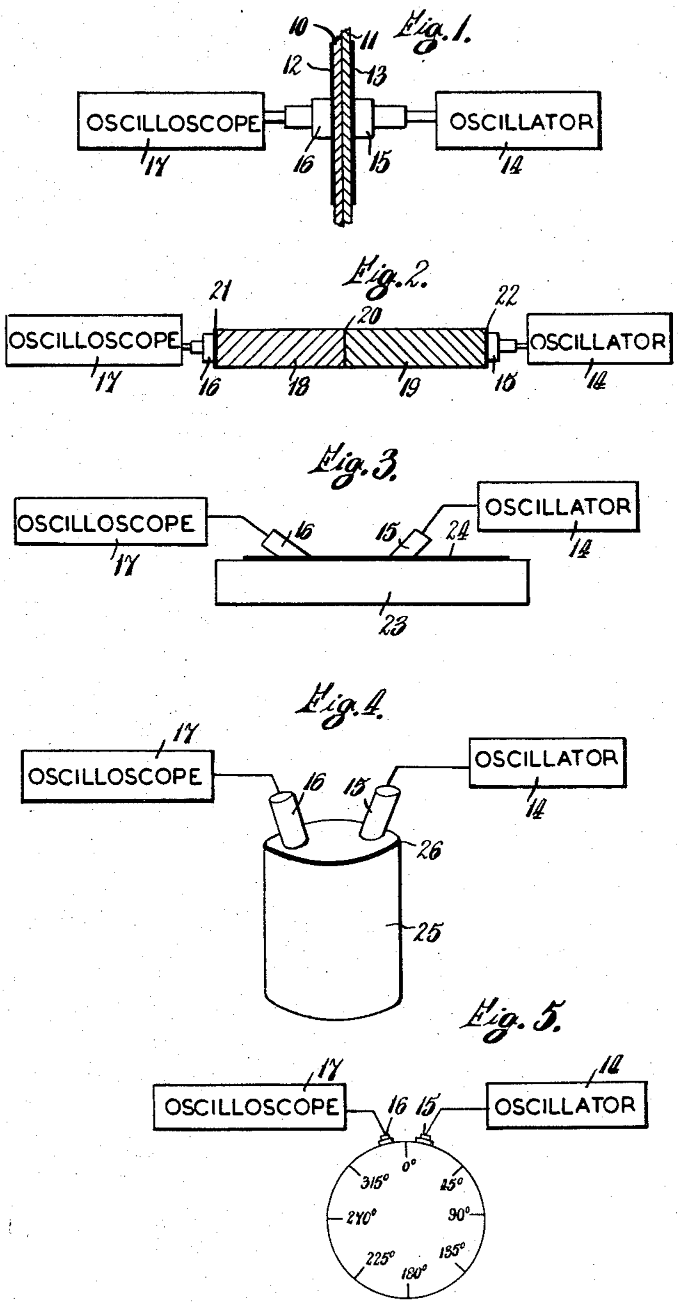
INVENTOR:
ROBERT WILSON
ATTORNEYS:
Moore & Hall United States Patent Office 2,830,201
Patented Apr. 8, 1958

2,830,201

ELECTRO-ACOUSTIC TRANSDUCER WITH ACOUSTIC COUPLING MEANS

Robert Wilson, Hillington, Glasgow, Scotland, assignor to Kelvin & Hughes Limited, Glasgow, Scotland, a company of Great Britain Application October 30, 1951, Serial No. 253,808

Claims priority, application Great Britain November 2, 1950

3 Claims. (Cl. 310—8.3)

The present invention relates to the non-destructive testing of solid bodies, particularly, but not exclusively, metal bodies.

In order to test solid bodies for flaws, such as blowholes in castings, faults in welded joints, and flaws in cast and wrought materials, it has been proposed to apply mechanical vibrations of supersonic frequency to the body and to examine the effects of the body on the transmission of these vibrations. Examples of this method of testing are described in the book Ultrasonics by B. Carlin published in 1949 by the McGraw-Hill Book Company Inc. The present invention is concerned with this method of testing which will be referred to hereinafter as the non-destructive acoustic method. The vibrations are usually produced by applying electric oscillations of suitable frequency either continuously or in recurring bursts to a piezo-electric crystal and the mechanical vibrations of the crystal thereby produced are transmitted to the body under test. In order to examine the effects of the body on the transmission of the vibrations, a pick-up device is employed to convert the mechanical vibrations, after transmission through the body, back to electrical oscillations which may conveniently be examined by means of an oscilloscope. The pick-up device is also usually a piezo-electric crystal coupled to the body at a suitable point. When recurring bursts of oscillations are used one transducer may be used for applying the vibrations to the body and for receiving vibrations from the body. On the other hand two transducers may be used and may be coupled to two faces of the body or to the same face. In the latter case the pick-up device receives waves reflected from another face and from flaws within the material.

It has been the practice hitherto to use a film of oil as an acoustic coupling medium for coupling the acoustic transducer or transducers to the body. The use of oil as the coupling medium, is, however, not always entirely satisfactory. For example, difficulty is sometimes experienced in obtaining and maintaining a sufficient thickness of oil film to ensure an adequate couple and hence it is usually necessary to employ highly skilled operators. When testing bodies having rough surfaces, for example castings and forgings, it is necessary to machine the surface before the oil is applied and the test carried out.

Furthermore, when using a film of oil or grease as the coupling medium, "surface noise" is sometimes of an amplitude comparable with echo or shadow indications on the screen of the oscilloscope.

Sometimes it is inconvenient to use oil or grease. For example, when testing carborundum wheels it is inconvenient to use a liquid or a grease as the coupling medium as the carborundum being porous absorbs some of the liquid or grease and this is usually undesirable.

One object of the present invention is to provide an improved vibration device, in which the aforesaid difficulty of obtaining and maintaining a sufficient thickness of the acoustic coupling medium can be overcome.

A further object of the present invention is to provide an improved vibration device in which the acoustic coupling medium is such that satisfactory results can be achieved when the surface of the body to be tested is rough.

Another object of the invention is to provide an improved vibration device by which the surface noise can be made less than that experienced when using a film of oil or grease as the coupling medium.

Yet another object of the invention is to provide an improved vibration device in which less care on the part of an operator is required to obtain and maintain a satisfactory acoustic couple.

The present invention is based upon the realisation of the fact that the principal requirements to be met by an ideal acoustic coupling medium for use in a non-destructive acoustic method of testing are:

(i) That its acoustic impedance should be $\sqrt{Z_1Z_2}$ where $Z_1$ and $Z_2$ are the acoustic impedances of the body to be tested and the vibrating member of the transducer which comes into contact with the medium, (ii) That it should be of material such that, in operation, when testing a body having a rough surface, the medium is in contact with substantialy the whole of the surface lying under the medium, (iii) That it should present a smooth surface to the transducer, (iv) That it should be of low absorption, (v) That it should be substantially dry.

It is common practice to employ Perspex probes for applying the vibrations from the vibrating crystal to the acoustic coupling medium, Perspex being a trademark registered in Great Britain. Such Perspex probes are well known and ordinarily comprise a block or a wedge-shaped piece of Perspex to which the crystal is affixed. The ultrasonic vibrations are transmitted from the crystal through the Perspex probe to the body being tested; such an arrangement permits the directing of vibrations at any desired angle into the body being tested and, of course, enables vibrations to be applied to the body being tested without having the crystal itself in direct contact with the body surface. The specific acoustic impedance (hereinafter, for shortness, referred to as the "acoustic impedance") of Perspex is approximately $0.294\times10^6$ grammes per second per square centimetre. The values of all acoustic impedances given in the remainder of this specification will be in like units. The acoustic impedance of steel is approximately $4.54\times10^6$ and hence the ideal value for the acoustic impedance of the medium used to couple a Perspex probe to a steel body being tested is approximately $1.15\times10^6$. Of the liquids commonly used water has an acoustic impedance of $0.143\times10^6$, transformer oil has an acoustic impedance of $0.123\times10^6$ and benzine has an acoustic impedance of $0.105\times10^6$. It will be seen that the acoustic impedances of all these liquids are much less than the ideal. Mercury has an acoustic impedance in the neighbourhood of $1.9\times10^6$ which approaches the ideal value very closely, and glycerine has an acoustic impedance of $0.24\times10^6$ which is much better than that of water, transformer oil and benzine. Mercury has not been used much, however, because of the difficulty in handling it and glycerine has not been used extensively because it is too sticky for easy handling. When water is used special care must be taken to protect the transducer and leads from ingress of water. It is for these reasons that transformer oil has usually been employed. Transformer oil is nevertheless not always satisfactory, and as previously mentioned the surface to which it is applied must be machined to provide a smooth finish. Furthermore it is wet, which is sometimes inconvenient.

It has been proposed to use a thin metal foil as the acoustic coupling medium. For example it has been proposed to use aluminium. It has been found however that the results obtained when using aluminium foil are little better, if any, than those obtained when placing the probe direct on to the surface of the body when the surface of the body is rough.

According to the present invention in a non-destructive acoustic method of testing a solid body, an acoustic coupling medium is used consisting at least mainly of a substance formed from a setting liquid which has been allowed to set, the liquid being of a kind which when set provides an elastic substance having a smooth and substantially dry surface and an acoustic impedance greater than that of water. By "substantially dry" is meant substantially dry to the touch. A satisfactory liquid for carrying out the invention has been found to be a chlorinated rubber paint. It is believed that the acoustic impedance of a layer of this paint when dry is in the neighbourhood of $0.32 \times 10^6$ which is appreciably greater than that of water.

Chlorinated rubber paint as herein used, is distinguished from other materials, such as metal-based paints, shellac or plaster of Paris, that have previously been used as bonding layers, in that when set, it provides a layer which, although it has a dry surface, nevertheless appears to have a more fluid core enveloped by a dry outer skin. Thus, the substances used in the art heretofore dry out completely and become substantially homogeneous whereas with chlorinated rubber paint it appears that the initial drying forms a skin which is impermeable to the atmosphere and thus prevents complete drying out of the core enveloped by the skin.

The liquid may be applied direct to the surface of the body to be tested and then allowed to set. This technique has been used on bodies having smooth surfaces and satisfactory results have been obtained.

When the surface of the body is rough it is preferred to use an acoustic coupling medium which has been made up separately and then squeegeed on to the surface of the body. When this technique is employed the medium does not readily come into contact with the whole of the surface beneath it but it does follow the contour of the surface at least to some extent. In order to exclude air from the remaining space between the medium and the body to be tested it is preferred to apply a suitable liquid to the surface of the body. Liquids such as a methylated spirit, paraffin, and a thin paste of flour and water have been found to give satisfactory results. Where it is inconvenient to use such a liquid the medium may be used dry. For example satisfactory results have been obtained when testing Carborundum wheels using a dry coupling medium produced from a dried layer of treated nylon.

In order to give strength to such a separate medium it is preferred to build up the medium on a fabric of fine mesh made from fine threads. For example 30 denier fine mesh nylon fabric has been found to be suitable for this purpose.

The invention will now be described by way of example with reference to the accompanying drawings, in which:

Fig. 1 is a sketch illustrating the manner in which bonded plates may be tested, Fig. 2 is a sketch illustrating the manner in which butt welded bars may be tested, Fig. 3 is a sketch illustrating the manner in which a reflection technique may be used to test a metal bar, Fig. 4 is a sketch illustrating the manner in which a casting may be tested, and Fig. 5 is a sketch illustrating the manner in which a steel bolt may be tested.

Referring to Fig. 1, this shows two metal plates 10 and 11 one of which is of white metal and the other is of steel. The two plates are bonded together and the outer faces of the two plates are coated with chlorinated rubber paint, one coat of primer being used on each face. The two layers of paint are indicated by the thick lines 12 and 13 respectively. An oscillator 14 generating oscillations of 2.5 mc./s. is connected to an acoustic transducer 15 which produces mechanical vibrations at the frequency of 2.5 mc./s. When the bond between the two plates 10 and 11 is being tested, the transducer 15 is pressed by an operator on to the layer of paint 13 which serves to transmit the mechanical vibrations to the plates 10 and 11. A second transducer 16 is in operation pressed on to the layer of paint 12 and serves to convert the mechanical vibrations reaching the layer 12 into electric oscillations which are applied to an oscilloscope 17 for examination. The two transducers 15 and 16 may be of any suitable type. For example they may be piezoelectric crystals mounted in a spring support.

In making a test using an arrangement as shown in Fig. 1, it is preferred to apply a smear of oil or grease to the surface of the paint when dry in order to facilitate movement of the probes over the surfaces and to reduce wear on the probes. The oiled or greased surfaces can be wiped to avoid any messiness, since the thickness of the film of oil or grease needed for lubrication is, of course, much less than that needed when an oil film serves as the sole coupling medium. The results obtained in the test were about equal to those obtained when using a film of oil or grease only. Less skill is required however in carrying out tests with the method just described and moreover the oil or grease does not come into contact with the surface of the body under test. The method can, therefore, be used when the presence of oil on the surface of the body is not permissible, as for example, when the body is absorbent, e. g. a Carborundum wheel.

Referring to Fig. 2, this shows an application of the invention to the testing of mild steel bar, flash butt welded in the centre. The welder bars are shown at 18 and 19 and are welded at 20. One coat of chlorinated rubber paint primer is applied to the two ends of the composite bar as is shown by the thick lines at 21 and 22.

Referring to Fig. 3, this illustrates the application of the invention to the testing of metal billets and bars. In Fig. 3 a billet 23 of steel in the "as rolled" condition has a coat of chlorinated rubber paint primer applied thereto as shown by the thick line at 24. The two transducers 15 and 16 are in this example pressed on to the layer 24 of paint and are arranged to transmit the vibrations to the billet at an angle of about 30° as shown. The mechanical vibrations transmitted to the billet are reflected from the lower surface of the billet on to the transducer 16.

Fig. 4 shows an application of the invention to the testing of a 4" diameter bar of grey cast iron. In this example the surface of one end of a bar 25 is given one coat of chlorinated rubber paint primer as shown by the thick line 26.

Fig. 5 shows an application of the invention to the testing of a mild steel engine bolt in the "as forged" condition. The whole of the bolt was given a coating of chlorinated rubber paint primer and a test indicated gross axial flaws. In order to obtain a complete analysis of each flaw before sectioning, a succession of oscillograms were taken, the probes of the transducers being moved 45° round the bolt for the successive tests. In this way it was found possible to map the geometry of each flaw with a fair degree of accuracy. The two transducers were separated by only a small angle, say 15°, as shown, for each test.

Although good results have been obtained by applying the chlorinated rubber paint directly, it has been found that fabric painted with chlorinated rubber paint and subsequently used when dry as the coupling medium is in most cases superior to the paint applied directly to the specimen when the surface is rough. Cotton gauze, silk gauze and "fine mesh" nylon fabric have been used, but the most satisfactory was found to be "fine mesh" 30 Denier nylon, chiefly because of its superior strength and pliability. Silk when properly coated is equally good but the paint application is more difficult.

DETAILS OF FABRICATION

*1st stage*

The untreated nylon cut to size (approx. 20" x 14") is stretched taut across a suitable wire frame and secured by means of "Bostik." The nylon blank is then left for a short period to allow the adhesive to dry.

*2nd stage* (*Paint preparation*)

The paint after being carefully sieved is made up to suitable viscosity with thinners preferably that sold under the trade name "Xylol." The most suitable viscosity being (25 secs.) using a standard "Ford Cap" paint viscometer.

*3rd stage*

The nylon is first sprayed with a light coat of thinners in order to ensure that the paint will penetrate the mesh. Immediately on the top of the thinners is sprayed the initial filling coat of chlorinated rubber paint (1 primer grey). This is applied by means of a very light even sweeping motion. The frame is now suspended horizontally between two iron rails in the steam oven and stoved for approx. 5 mins. at 75/80° cent. (165–175° F.).

*Note.*—The upper range of temperature 175° F. is fairly critical and care should be taken not to exceed this for any length of time. This operation of spraying on both sides with chlorinated rubber paint is continued (stoving between each coat) until a thickness of (approx. .018") is reached, this being gauged by means of a deadweight thickness tester.

*4th stage*

One thin coat (of red primer) is now sprayed on both surfaces and again stoved for 5 mins.

*5th stage*

The final operation is now carried out again employing the grey paint on each surface and the thickness is brought up to .024"–.026". The stoving time during this final operation should be cut down to a minimum, just sufficient to dry off the surfaces. The frames should now be hung up vertically and left for about 24 hours.

*6th stage*

Thickness measurements should now be taken on each frame. The specification of .024" minimum to .026" maximum should be adhered to as closely as possible. This thickness corresponds approximately to a half wavelength at 2.5 mc./s. and has proved to give optimum results. A small integral multiple of a half wavelength thickness is also satisfactory.

It has also been found that two or more layers of nylon fabric may be used in preparing the medium.

Fabric treated in this way has been used as probe covers fixed to the probes by a suitable adhesive. Prepared strips squeegeed on to the face of the sample may conveniently be used. The best results have been obtained when the surface of the body is smeared with methylated spirit, paraffin, or a thin paste of flour and water.

Using this technique results superior to those obtained when using oil only have been obtained when the surface was rough, for example, the surface of a casting or a billet in the "as rolled" condition.

This technique is also applicable to the continuous testing of welds, for example, as in a butt welded pressure vessel, and is of particular advantage when the surface is rough.

Some satisfactory tests have been made using a coat of chlorinated rubber paint primer and one or more coats of chlorinated rubber paint finisher.

It has been found that when using the method according to the invention, surface noise (which arises from friction between the transducer and the surface of the body under test) is substantially completely removed. This is of particular advantage when a photograph record is made of the traces on the screen of the oscilloscope in tests such as continuous tests of butt welds in butt-welded pressure vessels.

In every test carried out it has been found an advantage to lubricate the surface of the medium over which the transducer is moved.

I claim:

1. Acoustic apparatus for applying acoustic vibrations to a body having a surface through which said acoustic vibrations are to be transmitted, comprising an electromechanical transducer having a vibration-transmitting surface, means to excite said transducer to set the said surface thereof in vibration, and a non-metallic vibration-transmitting coupling layer of chlorinated rubber paint fixed in good vibration-transmitting contact to the said surface of said transducer, said layer having a smooth, substantially dry surface in good vibration-transmitting but slidable engagement with said surface on said body and having an acoustic impedance greater than that of water.

2. Acoustic apparatus for applying acoustic vibrations to a body having a surface through which said acoustic vibrations are to be transmitted, comprising an electro-mechanical transducer having a vibration-transmitting surface, means to excite said transducer to set the said surface thereof in vibration, and a non-metallic vibration-transmitting coupling layer fixed in good vibration-transmitting contact to one of said surfaces, said coupling layer comprising fabric coated with a setting liquid that has been allowed to set and having a smooth substantially dry outer surface in good vibration-transmitting but slidable engagement with the other of said surfaces on said body and transducer.

3. Acoustic apparatus according to claim 2, wherein said liquid is chlorinated rubber paint.

References Cited in the file of this patent

UNITED STATES PATENTS

| | | |
|---|---|---|
| 2,095,898 | Wolfe | Oct. 12, 1937 |
| 2,335,321 | Szegvari | Nov. 30, 1943 |
| 2,439,130 | Firestone | Apr. 6, 1948 |
| 2,458,581 | Firestone et al. | Jan. 11, 1949 |
| 2,461,543 | Gunn | Feb. 15, 1949 |
| 2,467,301 | Firestone | Apr. 12, 1949 |
| 2,602,327 | Bend | July 8, 1952 |
| 2,633,017 | Smoluchowski | Mar. 31, 1953 |
| 2,650,185 | Larson et al. | Aug. 25, 1953 |
| 2,702,764 | Painter | Feb. 22, 1955 |

FOREIGN PATENTS

| | | |
|---|---|---|
| 549,828 | Great Britain | Dec. 9, 1942 |
| 469,018 | Great Britain | July 14, 1937 |